United States Patent
Matsunaga et al.

(10) Patent No.: US 7,111,512 B2
(45) Date of Patent: Sep. 26, 2006

(54) ANGULAR RATE SENSOR

(75) Inventors: Toru Matsunaga, Miyagi (JP); Shigeto Watanabe, Miyagi (JP); Toshiyuki Kawamura, Miyagi (JP); Kazuo Kurihara, Saitama (JP); Yoshinori Satoh, Saitama (JP)

(73) Assignee: Sony Corporation, Tokyo (JP)

( * ) Notice: Subject to any disclaimer, the term of this patent is extended or adjusted under 35 U.S.C. 154(b) by 43 days.

(21) Appl. No.: 10/956,424

(22) Filed: Oct. 1, 2004

(65) Prior Publication Data

US 2005/0146618 A1 Jul. 7, 2005

(30) Foreign Application Priority Data

Oct. 10, 2003 (JP) .......................... P2003-352901

(51) Int. Cl.
*G01P 9/00* (2006.01)
*H01L 41/08* (2006.01)

(52) U.S. Cl. .................... 73/504.12; 310/358

(58) Field of Classification Search ............. 73/504.02, 73/504.04, 504.12, 504.15, 504.16, 514.29, 73/514.32; 310/330–332, 348, 357–358, 310/367–368, 320–321
See application file for complete search history.

(56) References Cited

U.S. PATENT DOCUMENTS

| | | | |
|---|---|---|---|
| 5,221,870 A * | 6/1993 | Nakahata et al. | 310/313 A |
| 5,635,786 A * | 6/1997 | Fujimoto et al. | 310/316.01 |
| 5,794,080 A * | 8/1998 | Watanabe et al. | 396/53 |
| 6,021,671 A * | 2/2000 | Kami et al. | 73/514.34 |
| 6,044,706 A * | 4/2000 | Roh | 73/504.12 |
| 6,590,316 B1 * | 7/2003 | Koike et al. | 310/358 |
| 6,903,491 B1 * | 6/2005 | Irie et al. | 310/328 |
| 6,943,484 B1 * | 9/2005 | Clark et al. | 310/334 |

FOREIGN PATENT DOCUMENTS

JP 2000-241167 * 9/2000

* cited by examiner

Primary Examiner—Helen Kwok
(74) Attorney, Agent, or Firm—Sonnenschein Nath & Rosenthal LLP (57) ABSTRACT

An angular rate sensor includes a quadratic prism-like oscillator 1a formed by laminating a substrate 2 and a piezoelectric material 3, the piezoelectric material 3 is made of piezoelectric ceramics including PZT (Lead Zirconate Titanate) as a main component, and the substrate 2 is made of a material other than PZT having physical property values equivalent to or less than PZT, which is a main component of the piezoelectric ceramics, with respect to Young's modulus, thermal expansion coefficient, and the like.

5 Claims, 11 Drawing Sheets

<MATERIAL PROPERTIES COMPARISON>

| MATERIAL | DENSITY (g/cm3) | YOUNG'S MODULUS (GPa) | POISSON'S RATIO | HARDNESS Hv | THERMAL EXPANSION COEFFICIENT $(10^{-7})$ | BENDING STRENGTH (MPa) |
|---|---|---|---|---|---|---|
| PZT (BZ27M5) | 8.09 | 103 | 0.33 | 300 | 32-35 | 135 |
| AMORPHOUS CARBON | 1.46-1.60 | 30-33 | | 500 | 30 | 100-220 |
| GRAPHITE | 1.6 | 14 | | 150 | 32 | 40-90 |
| MAGNESIUM TITANATE ($MgTiO_3$) | 3.6 | 215 | | 630 | 134 | 265 |
| CALCIUM TITANATE ($CaTiO_3$) | 4.2 | 260 | 0.33 | 900 | 110 | 274 |
| MN-ZN FERRITE | 4.9 | 176 | 0.326 | 650 | 114 | 170 |
| 96% ALUMINUM ($Al_2O_3$) | 3.7 | 320 | 0.23 | 1370 | 72 | 350 |
| $Al_2O_3$-TiC | 4.24 | 392 | | 2000 | 78 | 835 |
| BRASS | 8.5 | 110 | 0.35 | | 170 | |

FIG. 11

ANGULAR RATE SENSOR

RELATED APPLICATION DATA

The present application claims priority to Japanese Application(s) No(s). P2003-352901 filed Oct. 10, 2003, which application(s) is/are incorporated herein by reference to the extent permitted by law.

BACKGROUND OF THE INVENTION

1. Field of the Invention

The present invention relates to an angular rate sensor used for detecting e.g., video camera shake, the operation of a virtual reality apparatus, the direction in a car navigation system or the like.

2. Description of the Related Art

A so-called oscillation gyro type angular rate sensor has been widely available as consumer use. The osillation gyro type angular rate sensor detects angular rate by oscillating a rod-like oscillator at a predetermined resonance frequency and detecting Coriolis force generated by influence of angular rate with a piezoelectric element or the like.

For driving an oscillator in the angular rate sensor like this, a method using a separately-excited oscillation type driving circuit and one using a self-excited oscillation type driving circuit are available. However, the method using a separately-excited oscillation type driving circuit has a problem that when a difference is made between oscillation frequency and resonance frequency of an oscillator due to influence of temperature characteristics of the oscillator or the like, sensitivity for detecting Coriolis force rapidly decreases. Therefore, the method using a separately-excited oscillation type driving circuit has not been in practical use.

Consequently, the method using a self-excited oscillation type driving circuit in which the oscillator is incorporated in a loop of a phase-shift oscillator circuit is now widely used. Since the angular rate sensor using this method self-oscillates at the resonance frequency of oscillator, sensitivity thereof hardly changes due to influence of the temperature characteristics, thereby obtaining an angular rate output having stable sensitivity in a wide temperature range (refer, for example, to Jpn. Pat. Appln. Laid-Open Publication No. 2000-131077).

Figure 1A:
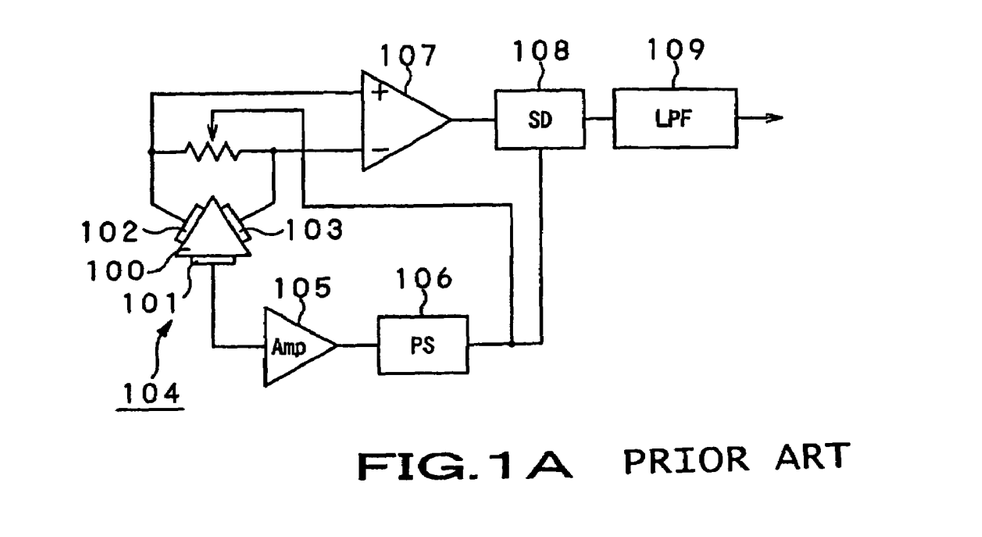
FIGS. 1A to 1C are views of an example of a conventional angular rate sensor, FIG. 1A being a view showing the entire configuration of the angular rate sensor, FIG. 1B being a perspective view showing a part of an oscillator, and FIG. 1C being a cross-sectional view showing the cross section in the central part of the oscillator.
Figure 1B:
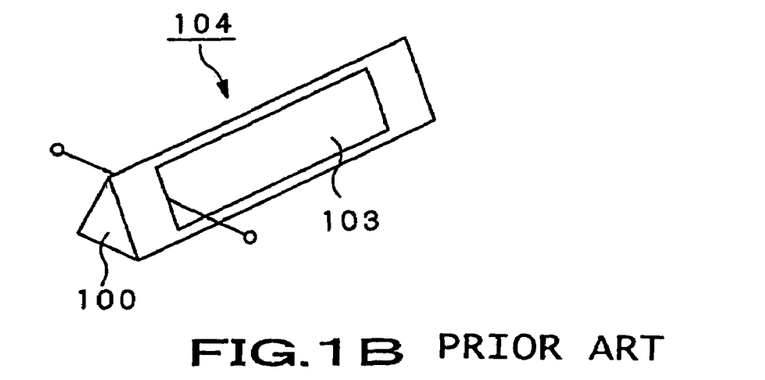
Figure 1C:
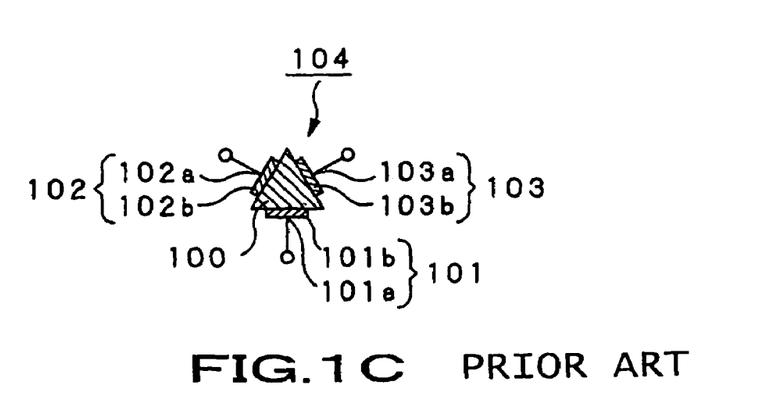

A conventional angular rate sensor shown in FIGS. 1A, 1B, and 1C includes a triangular prism-like oscillator 104 having a triangular prism-like constant elastic oscillator 100. The constant elastic oscillator 100 has first to third piezoelectric elements 101 to 103 attached to the side surfaces thereof, respectively. The first piezoelectric element 101 is composed of an electrode 101a and a piezoelectric material 101b. The second piezoelectric element 102 is composed of an electrode 102a and a piezoelectric material 102b. The third piezoelectric element 103 is composed of an electrode 103a and a piezoelectric material 103b. For example, the constant elastic oscillator 100 is a constant elastic metal oscillator.

The conventional angular rate sensor includes an amplifier 105 connected to the first piezoelectric element 101, a phase shifter 106 connected to the amplifier 105, a differential amplifier 107 connected to the second and third piezoelectric elements 102 and 103, a synchronous detector 108 connected to the differential amplifier 107, and a low-pass filter 109 connected to the synchronous detector 108. In the conventional angular rate sensor, the second and third piezoelectric elements 102 and 103 detect oscillation of the oscillator 104 for performing self-excited oscillation as well as Coriolis force generated in the oscillator 104.

The angular rate sensor using the triangular prism-like oscillator 104 has the highest sensitivity at the present time and therefore is currently mainstream. However, the angular rate sensor of this type has a complicated structure, which makes it difficult to produce high volume efficiency in manufacturing process. For example, in the above configuration, process of bonding piezoelectric elements to each of the triangular prism-like constant elastic oscillators is required, with the result that volume efficiency cannot be improved. Further, along with the miniaturization of the sensor, accuracy in a support mechanism or bonding accuracy of the piezoelectric element to the constant elastic metal oscillator has been increasingly demanded. In addition, influence of a bonding layer to the oscillator is increased. Therefore, manufacturing efficiency is lowered and manufacturing cost is significantly increased.

Figure 2A:
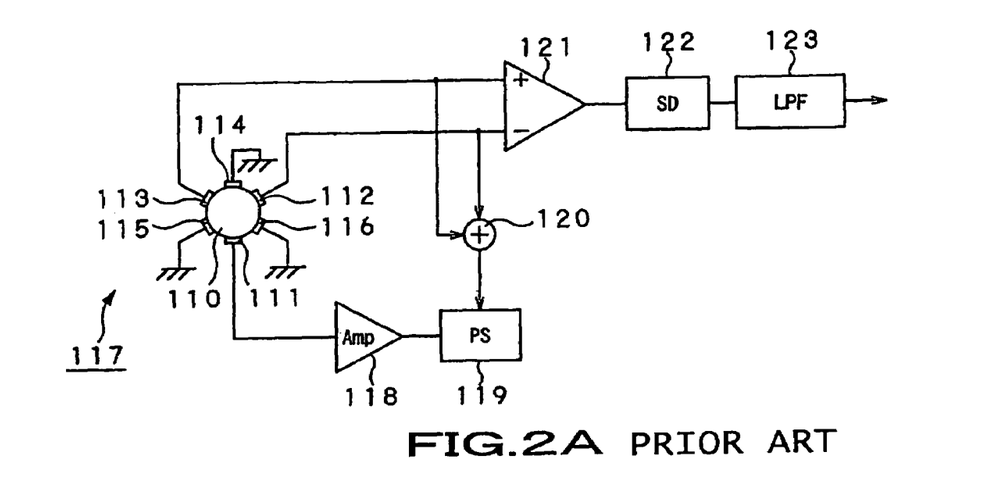
FIG. 2A to 2C are views of another example of a conventional angular rate sensor, FIG. 2A being a view showing the entire configuration of the angular rate sensor, FIG. 2B being a perspective view showing a part of an oscillator, and FIG. 2C being a cross-sectional view showing the cross section in the central part of the oscillator.
Figure 2B:
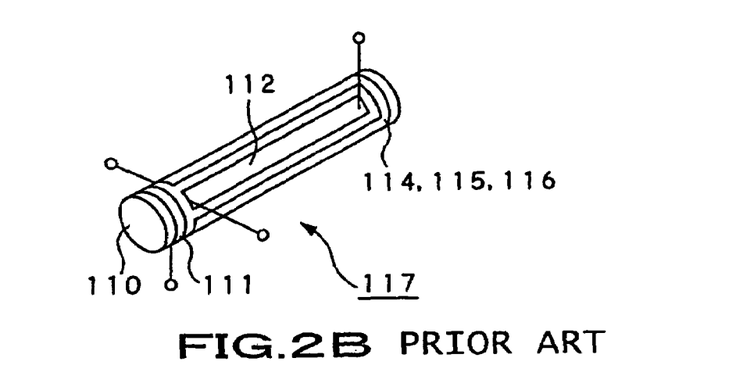
Figure 2C:
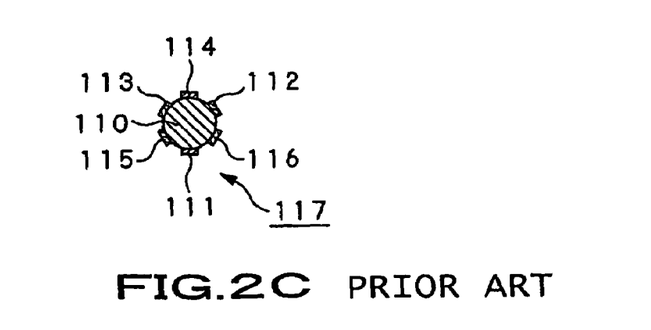

Another conventional angular rate sensor shown in FIGS. 2A, 2B and 2C includes an oscillator 117 having a columnar piezoelectric ceramic oscillator 110. The piezoelectric ceramic oscillator 110 has six electrodes 111 to 116 printed on a side surface thereof. The first to third electrodes 111 to 113 are independently formed. The fourth to sixth electrodes 114 to 116 are connected to the same ground potential. This angular rate sensor includes an amplifier 118 connected to the first electrode 111, a phase shifter 119 connected to the amplifier 118, an adder 120 connected to the phase shifter 119, a differential amplifier 121 connected to the second and third electrodes 112 and 113, a synchronous detector 122 connected to the differential amplifier 121, and a low-pass filter 123 connected to the synchronous detector 122. This angular rate sensor applies a voltage to the first electrode 111 to oscillate the oscillator 117, and detects Coriolis force generated in the oscillator 117 with the second and third electrodes 112 and 113.

In this conventional angular rate sensor, the electrodes 111 to 116 are printed on the oscillator 117 as described above. This eliminates the need to bond the piezoelectric elements to the oscillator 117 and makes the structure of the sensor relatively simple. However, in the case where the sensor size is reduced, it is difficult to produce an accurately configured piezoelectric ceramic oscillator 110 and, it is also difficult to print the electrodes onto the piezoelectric ceramic oscillator 110 with high accuracy.

That is, while this conventional angular rate sensor uses the columnar piezoelectric ceramic oscillator 110, it is difficult to manufacture, with high accuracy, the columnar piezoelectric ceramic oscillator 110 as compared to the triangular prism-like or quadratic prism-like oscillator. Further, it is not easy to print the electrodes onto the rounded surface of this angular rate sensor with high accuracy. As described above, the use of the columnar piezoelectric ceramic oscillator 110 makes it difficult to produce the angular rate sensor in large volume. Even though the mass-production has been realized, it is difficult to reduce manufacturing cost.

In addition to the conventional oscillation configuration of the angular rate sensor, unimorph-type and bimorph-type oscillators are widely used.

In the unimorph-type and bimorph-type oscillators, a combination of the same materials such as PZT (Lead Zirconate Titanate) are used to form the oscillator in general, in order to reduce manufacturing cost by common use of raw materials, to stabilize workability, to increase accuracy, and to reduce adversely effect due to influence of adhesion performance or thermal characteristics change.

However, since the thermal characteristics change in a piezoelectric material, such as PZT or the like, is non-linear, it is difficult to reduce temperature change in some characteristics in the case where the PZT is used as a substrate. Further, when detection sensitivity or detuning degree (frequency difference between lateral and vertical oscillations) that greatly contributes the detection sensitivity or frequency responsibility needs to be freely designed, the above factors are uniquely determined by section size of the oscillator and materials of the substrate, with the result that design freedom of a configuration of the oscillator tends to be limited.

Further, in the case of non-polarized state (mono-morph) in which the same PZTs are laminated and thereby the substrate does not have piezoelectricity, characteristics change in the resonance resistance obtained in the case where a single body of the oscillator is self-oscillated or in the sensitivity of an angular rate sensor using the same oscillator with respect to environmental temperature is large. This characteristics change tends to increase with higher temperatures. Thus, it is necessary to compensate the characteristics change by means of an electric circuit in order to maintain a predetermined performance level even at the place where environmental temperature change is large, such as outdoors, which makes it very difficult to simplify a circuit configuration and to reduce the number of parts. Further, it is difficult to fully compensate the above characteristics change using the electrical circuit since the characteristics change itself is non-linear. Therefore, the angular rate sensor using the same oscillator cannot be applied to the model having narrow tolerance ranges in characteristics change with respect to environmental change.

In the angular rate sensor for stabilizing an image, which is often mounted in devices provided with an image output unit, such as a video camera, it is necessary to control oscillation frequency of the oscillator to fall within a predetermined range in order to prevent interference of electromagnetic wave traveling in the case of the device, vibration or the like, or mutual interaction between them. Further, in order to allow detuning degree, which shows a strong correlation with sensitivity or frequency responsibility, to have a target value, vertical oscillation frequency and lateral oscillation frequency must be separately adjusted. However, when an initial state value is very far from the target value, not only it becomes difficult to perform adjustment itself, but there is a possibility that the adjustment cannot be achieved.

Note that the detuning degree is a difference between resonance frequencies in the vertical and lateral directions. The smaller the detuning degree, the higher the sensitivity becomes.

SUMMARY OF THE INVENTION

The present invention has been made in view of the above situation, and an object thereof is to provide an angular rate sensor excellent in detection sensitivity, capable of producing high volume efficiency in manufacturing process with a simple structure, and having relatively satisfactory dimensional accuracy of the oscillator that determines essential characteristics of the angular rate sensor.

An angular rate sensor according to the present invention includes a quadratic prism-like oscillator formed by laminating a substrate and piezoelectric material, the piezoelectric material is made of piezoelectric ceramics including PZT (Lead Zirconate Titanate) as a main component, and the substrate is made of a material other than PZT having physical property values equivalent to or less than PZT, which is a main component of the piezoelectric ceramics, with respect to Young's modulus and thermal expansion coefficient.

In the angular rate sensor according to the present invention, the substrate is made of a material including e.g., carbon as a main component.

In the angular rate sensor according to the present invention, the substrate is made of e.g., amorphous carbon.

In the angular rate sensor according to the present invention, a ratio between the thicknesses of the piezoelectric material and oscillator is allowed to fall within a range of 0.14 to 0.27.

In the angular rate sensor according to the present invention, a ratio between the full width and thickness of the oscillator is allowed to fall within a range of 1.030 to 1.055.

The angular rate sensor according to the present invention includes: a reference electrode which is formed on one main surface of two opposed surfaces of the piezoelectric material, the one main surface being bonded to the substrate, and which is connected to a reference potential; at least one drive electrode which is formed on the other main surface of the two opposed surfaces of the piezoelectric material in the longitudinal direction of the oscillator, and to which a signal for oscillating the oscillator is supplied; and at least a pair of detection electrodes which are formed, in parallel with each other, on the other main surface of the two opposed surfaces of the piezoelectric material in a manner to sandwich the drive electrode, and which output a signal corresponding to Coriolis force generated in the oscillator, wherein a voltage is applied between the drive electrode and reference electrode to allow the piezoelectric material to oscillate the oscillator, Coriolis force generated in the oscillator is detected with the piezoelectric material, and an angular rate detection signal is output, as a signal corresponding to Coriolis force, from the detection electrodes.

In the angular rate sensor according to the present invention, the substrate is made of a material other than PZT having Young's modulus and thermal expansion coefficient equivalent to or less than PZT, which is a main component of the piezoelectric material, so that the oscillator is less subject to influence of environmental temperature change. Therefore, temperature change in resonance resistance/sensor sensitivity of a single body of the oscillator can be reduced. Further, since the temperature change is made linear, it is possible to perform compensation easily.

Further, since the substrate is more subject to elastic deformation than the substrate made of a combination of PZTs, the degree of change in detuning degree with respect to a ratio (W/T) between the width (W) and the thickness (I) of the oscillator is decreased to reduce required accuracy with respect to the oscillator dimensions, so that design freedom is increased. Further, a ratio of the horizontal size to the vertical size in the oscillator cross-sectional aspect ratio to be adjusted for obtaining predetermined detuning degree becomes large, so that electrode area can be increased.

In the angular rate sensor according to the present invention, by allowing a ratio between the thickness of the piezoelectric material and the thickness of the oscillator to fall within a range of 0.14 to 0.27, it is possible to reduce resonance resistance and oscillation frequency within a certain range, and to assure enough phase margin in the drive circuit for self-excited oscillation of the oscillator.

Further, by allowing a ratio between full width and thickness of the oscillator to fall within a range of 1.030 to 1.055, it is possible to reduce the degree of frequency change with respect to the dimensional change in the oscillator, which makes it easy to perform adjustment to a predetermined detuning degree or oscillating frequency.

Further, in the angular rate sensor according to the present invention, a combination of PZT and the same ceramics based material as PZT is employed, so that it is possible to handle these materials as a compound of the same brittle material to easily apply cutting and grinding process to it with a grind stone. Accordingly, compatibility between mass productivity and processing accuracy can be realized.

The angular rate sensor according to the present invention has a very simple structure obtained by laminating the piezoelectric material and substrate, and thereby does not lose accuracy even when the size thereof is reduced. Therefore, it is possible to obtain high-cost performance. That is, it is possible to obtain the configuration having a potential for producing high volume efficiency.

DETAILED DESCRIPTION OF THE PREFERRED EMBODIMENTS

An embodiment of the present invention will be described below in detail with reference to the accompanying drawings. The present invention is not limited to the following examples, and can be variously modified without departing from the spirit and scope of the invention.

Figure 3:
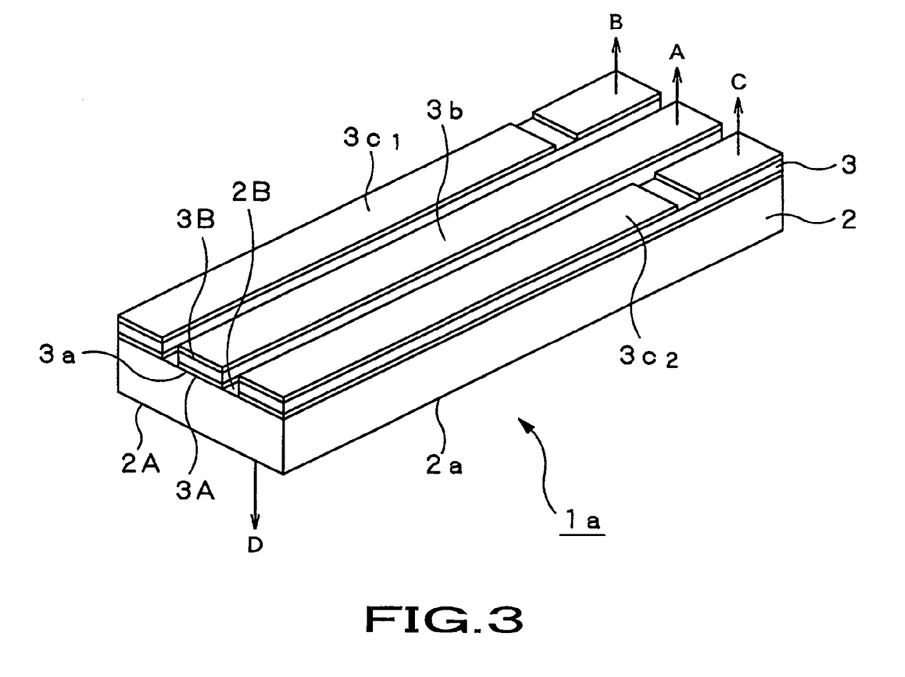
FIG. 3 is a perspective view showing an oscillator provided in an angular rate sensor to which the present invention is applied.
Figure 4:
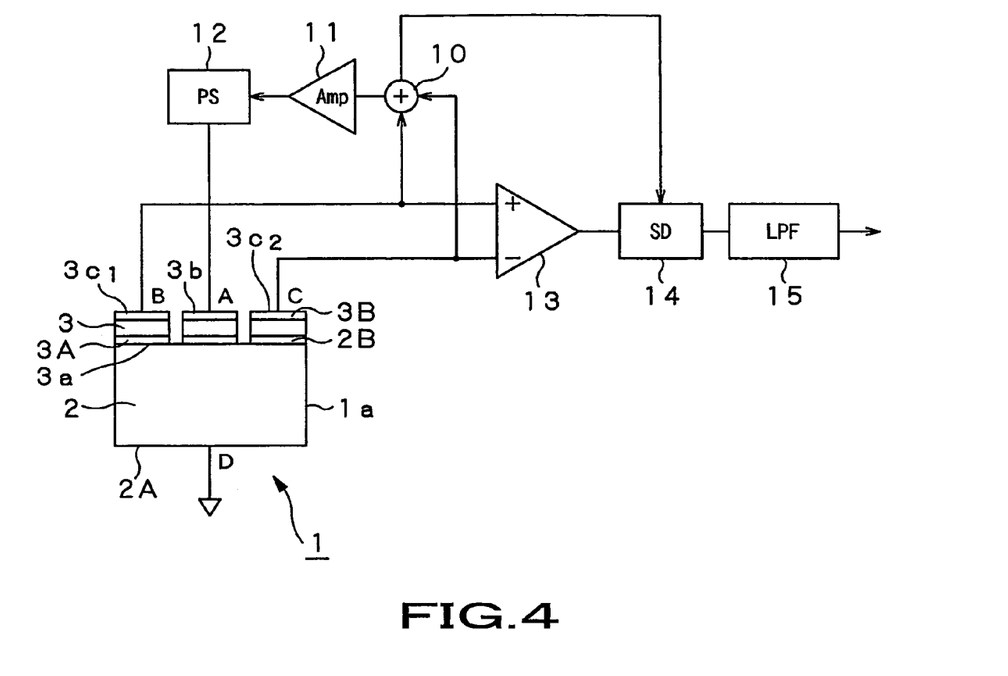
FIG. 4 is a block diagram showing an example of a circuit for realizing the angular rate sensor.

FIG. 3 is a perspective view showing an oscillator 1a provided in an angular rate sensor 1 to which the present invention is applied. FIG. 4 is a block diagram showing an example of a circuit for realizing the angular rate sensor 1. The angular rate sensor 1 according to the present embodiment includes, as shown in FIGS. 3 and 4, the oscillator 1a acting as an oscillation gyro.

The oscillator 1a is formed by laminating a substrate 2 and a piezoelectric material 3 and formed into a quadratic prism-like shape having a rectangular cross section when the oscillator is cut with a plane perpendicular to the longitudinal direction thereof.

The piezoelectric material 3 of the oscillator 1a is made of piezoelectric ceramics including a PZT (Lead Zirconate Titanate) as a main component, and is obtained through polarization process, in general.

The substrate 2 is made of a compound including, as a main component, a material other than PZT having physical property values equivalent to or less than PZT, which is a main component of the piezoelectric ceramics included in the piezoelectric material 3, with respect to Young's modulus and thermal expansion coefficient, e.g., amorphous carbon or graphite.

Figure 5:
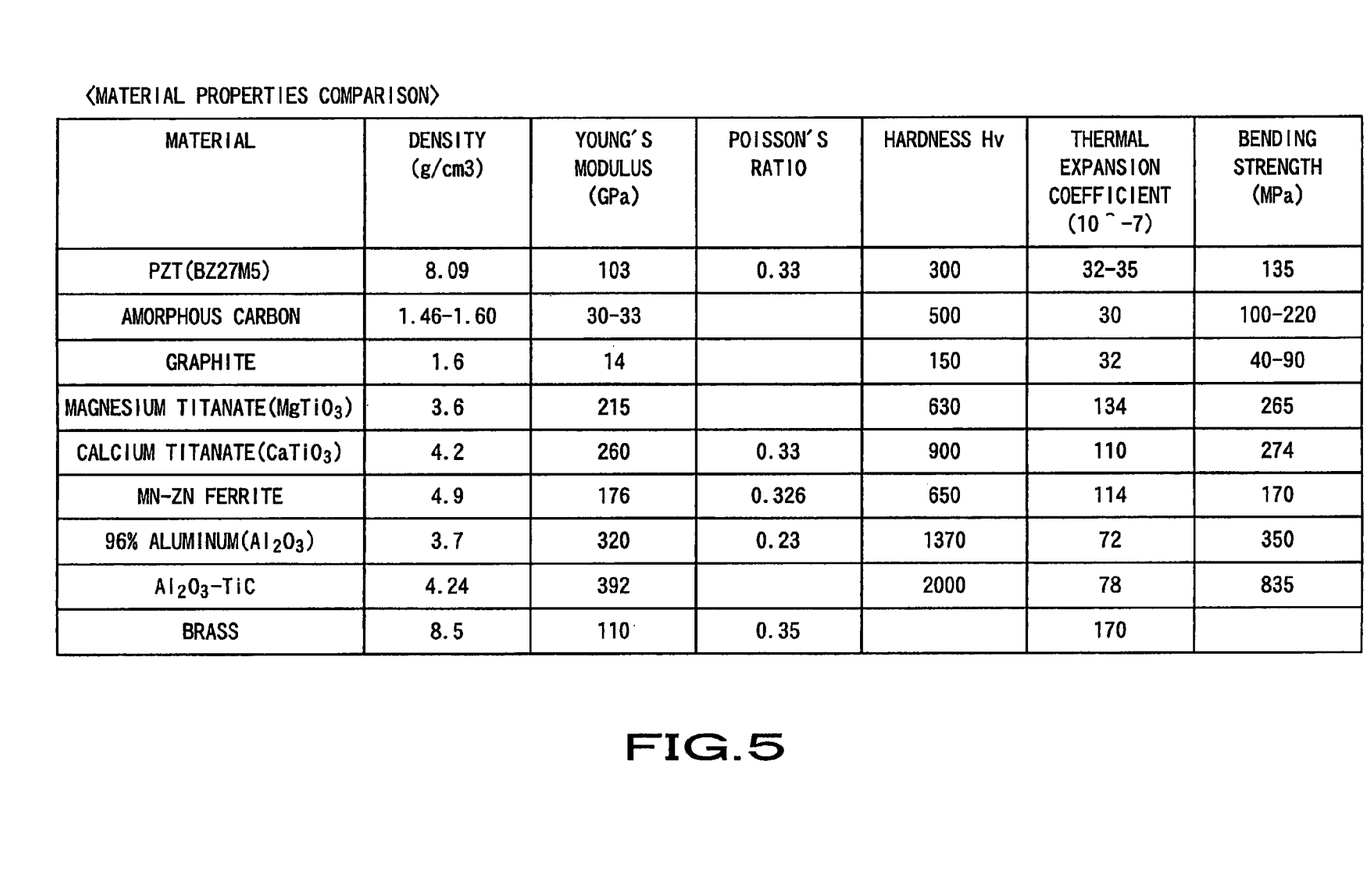
FIG. 5 is a table showing a comparison result with respect to physical properties of different types of materials.

FIG. 5 is a table showing a comparison result of physical property values of various types of materials. As can be seen from the table, PZT (BZ27M5), which is a main component of the piezoelectric ceramics, has a Young's modulus of 103 GPa, and a thermal expansion coefficient of $32 \times 10^{-7}$ to $35 \times 10^{-7}$. Whereas, Young's modulus of amorphous carbon and graphite are 30 to 33 GPa and 14 GPa, and their thermal expansion coefficients are $30 \times 10^{-7}$, and $32 \times 10^{-7}$, respectively. As described above, amorphous carbon and graphite have physical property values equivalent to or less than PZT, which is a main component of the piezoelectric ceramics, with respect to Young's modulus and thermal expansion coefficient.

The piezoelectric material 3 has one main surface 3A to be bonded to the substrate 2 and the other main surface 3B which are opposed to each other. A reference electrode $3a$ is formed on the main surface 3A. Further, a drive electrode $3b$ and a pair of detection electrodes $3c_1$, $3c_2$ are formed separately to, and in parallel with each other along the longitudinal direction of the oscillator $1a$ in a manner that the drive electrode $3b$ is sandwiched between the detection electrodes $3c_1$, $3c_2$.

In the angular rate sensor 1, the thickness of the piezoelectric material 3 is smaller than that of the substrate 2. Here, for example, the piezoelectric material has a thickness of 0.2 mm, and the substrate has a thickness of 0.8 mm.

The angular rate sensor 1 applies a voltage between the reference electrode $3a$ formed on the one main surface 3A of the piezoelectric material 3 included in the oscillator $1a$ formed by laminating the substrate 2 and piezoelectric material 3 and the drive electrode $3b$ formed on the other main surface 3B opposed to the main surface 3A to oscillate the oscillator $1a$, detects Coriolis force generated in the oscillator $1a$ with the piezoelectric material 3, and outputs from the detection electrodes $3c_1$ and $3c_2$ formed on the other main surface 3B an angular rate detection signal that corresponds to the detected Coriolis force.

Since amorphous carbon functioning as a conductive material is used as the substrate 2 that faces a main surface of the piezoelectric material 3 in the angular rate sensor 1 according to the present embodiment, the two surfaces 2A and 2B need not be electrically connected to each other. Therefore, the oscillator $1a$ has a configuration obtained by simply laminating the substrate 2 and piezoelectric material 3. Note that it is possible to form the electrode by coating a conductive material on all surfaces of the substrate 2.

Terminals A, B and C are derived from the drive electrode $3b$ formed on the other main surface 3B of the piezoelectric material 3, and the pair of detection electrodes $3c_1$ and $3c_2$, respectively in the angular rate sensor 1. A terminal D is derived from the main surface 2A of the substrate 2, the main surface 2A being electrically connected to the reference electrode $3a$ formed on the main surface 3A of the piezoelectric material 3.

The piezoelectric material 3 of the angular rate sensor 1 has a function of driving oscillation as well as a function of detecting the oscillation. With the above configuration, the angular rate sensor 1 detects, with the detection function, Coriolis force generated by the rotation of the oscillator $1a$ while the angular rate sensor 1 oscillates with the oscillation drive function.

In the angular rate sensor 1, as shown in FIG. 4, the adder 10 and differential amplifier 13 are connected respectively to the terminals B and C derived from the pair of detection electrodes $3c_1$ and $3c_2$. The sum output of the adder 10 is amplified by the amplifier 11 and supplied to the phase shifter 12. The output terminal of the phase shifter 12 is connected to the terminal A derived from the drive electrode $3b$. This configuration functions as the oscillation drive section for oscillating the oscillator $1a$. Note that the terminal D derived from the main surface 2A of the substrate 2, the main surface 2A being electrically connected to the reference electrode $3a$ formed on the one main surface 3A of the piezoelectric material 3, is connected to a reference voltage terminal having a predetermined potential.

The adder 10, amplifier 11, phase shifter 12, and oscillator $1a$ constitute a so-called phase-shift oscillator circuit in the angular rate sensor 1. With the phase-shift oscillator circuit, the oscillator $1a$ is self-oscillated. The oscillation direction of the oscillator $1a$ is perpendicular to the main surface 3B of the piezoelectric material 3 provided with the drive electrode $3b$. This direction is hereinafter referred to as merely "oscillation direction".

The output terminals of the adder 10 and differential amplifier 13 connected to the terminals B and C derived from the pair of detection electrodes $3c_1$ and $3c_2$ are connected to the synchronous detector 14, which is connected to the low-pass filter 15. These components and the piezoelectric material 3 function as the detection section for detecting the rotation of the oscillator $1a$.

That is, while the oscillator $1a$ oscillates in the oscillation direction, the rotation of the oscillator $1a$ generates Coriolis force in the oscillator $1a$. The angular rate sensor 1 detects the generated Coriolis force with the piezoelectric material 3, outputs it from the detection electrodes $3c_1$ and $3c_2$ as signals having opposite polarity to each other, and inputs the signals to the differential amplifier 13. The output amplified by the differential amplifier 13 is input to the synchronous detector 14, where synchronous detection is performed. At this time, the output from the adder 10 is supplied to the synchronous detector 14 as a synchronous signal for the synchronous detection to be performed. The signal from the synchronous detector 14 is passed through the low-pass filter 15, and is then output as an angular rate signal obtained by detecting Coriolis force generated in the oscillator $1a$.

As described above, in the angular rate sensor 1, the piezoelectric material 3 is used to oscillate the oscillator $1a$, and Coriolis force generated in the oscillator $1a$ at this time is detected with the piezoelectric material 3. Angular rate can thus be detected based on Coriolis force detected by the piezoelectric material 3.

Figure 6A:
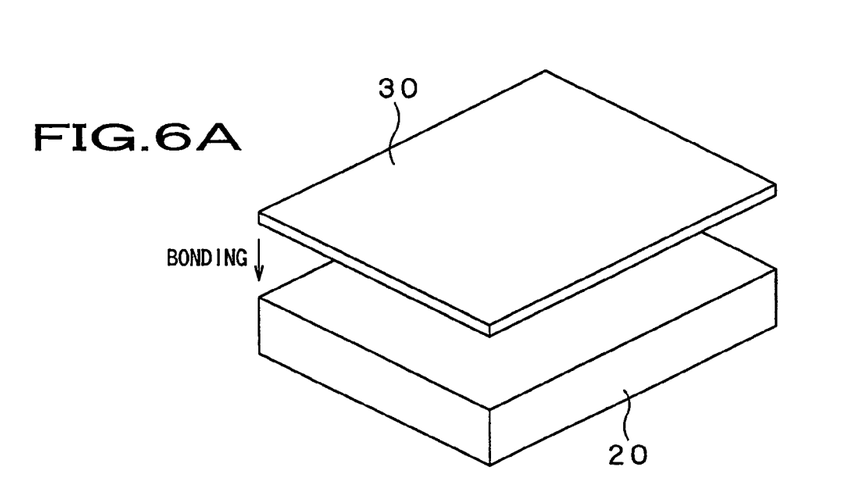
FIGS. 6A, 6B and 6C show an example of a method for manufacturing the angular rate sensor.
Figure 6B:
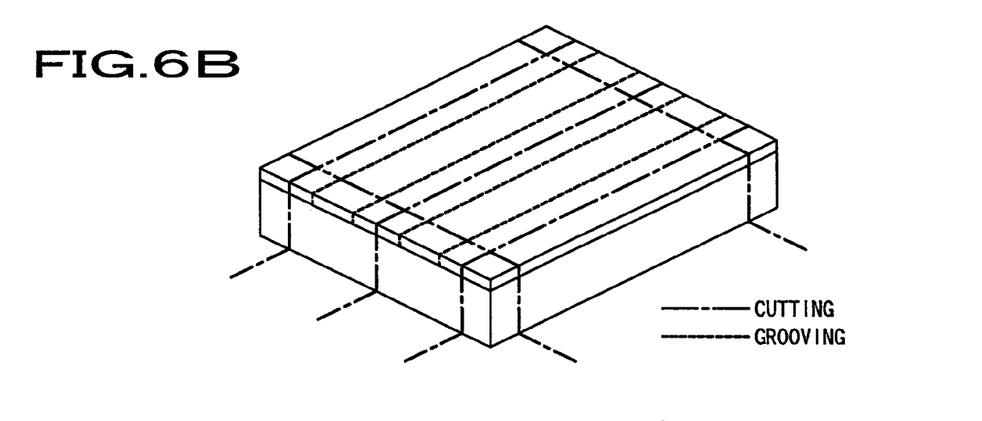
Figure 6C:
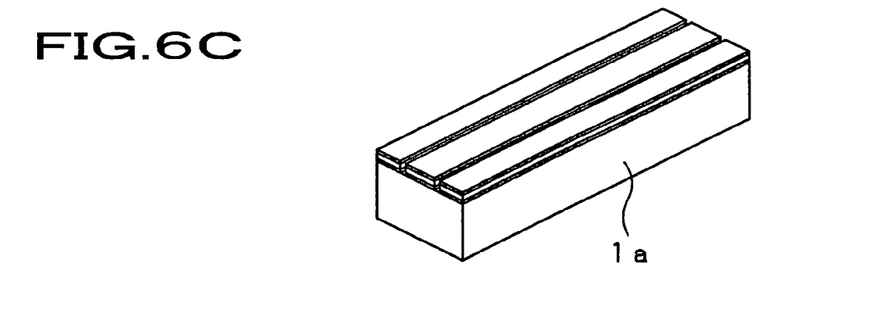

In the angular rate sensor 1 having the above configuration, the detection electrodes $3c_1$ and $3c_2$, and drive electrode $3b$ are disposed on the same plane. Therefore, it is possible to manufacture the oscillator $1a$ by the following process. That is, a wafer 20, which is a base body of the substrate, on all the surfaces of which the electrode is formed by coating a conductive material, and a wafer 30, which is a base body of the piezoelectric material, on which electrodes are formed by applying double-sided electrode coating, are laminated and bonded to each other, as shown in FIG. 6A, followed by being subject to grooving and cut out separately as a quadratic prism as shown in FIG. 6B, thereby obtaining the oscillator $1a$ as shown in FIG. 6C. The oscillator $1a$ manufactured in the above process shows high accuracy, and the size thereof can be extremely reduced. Further, this configuration makes it possible to produce high volume efficiency in manufacturing process. The problem of bond displacement of the piezoelectric material can also be solved. Since the substrate and piezoelectric material have substantially the same cutting workability, the oscillator can be easily cut out from laminated wafers of the substrate and piezoelectric material.

Further, the above configuration eliminates difficult process, such as bonding a piezoelectric material to a constant elastic metal oscillator, or printing electrodes onto a curved surface.

In the angular rate sensor 1, the reference electrode $3a$ is formed on the one main surface 3A of the piezoelectric material 3, which is to be bonded to the substrate 2. Since the substrate 2 has conductivity, simple bonding of the main surface 3A of the piezoelectric material 3 and the main surface 2B of the substrate 2 allows effective application of a driving electric field to the piezoelectric material 3, thereby increasing sensitivity.

It can be considered that miniaturization increases technical difficulty, and makes it difficult to assure sufficient accuracy. However, by applying fine process technology that has been established in the field of LSI or head process, such a problem can be solved. Therefore, manufacturing with high dimensional accuracy can be achieved, thereby simplifying frequency adjustment of the oscillator.

Further, a self-excited oscillation type drive circuit is applied to the angular rate sensor 1 according to the present embodiment to constitute a highly accurate angular rate sensor with a very simple structure.

Since the angular rate sensor 1 is a self-excited oscillation type, sensitivity thereof hardly decreases due to influence of temperature characteristics as in the case of the separately-excited angular rate sensor.

Figure 7:
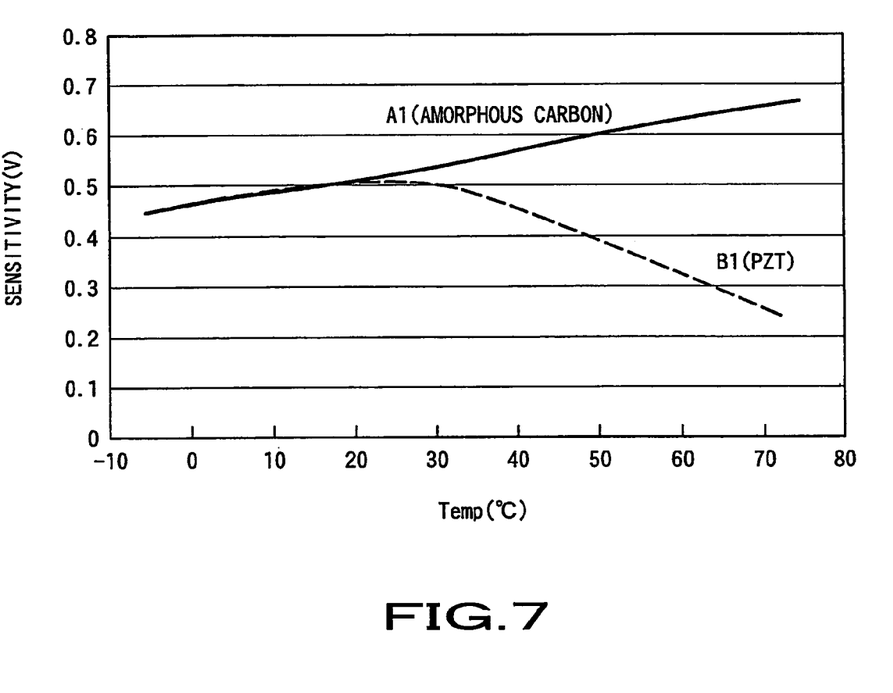
FIG. 7 shows a result of actual measurement of change characteristics in the sensitivity of the angular rate sensor with respect to environmental temperature change.

FIG. 7 shows a result of actual measurement of change characteristics in the sensitivity of the angular rate sensor 1 with respect to environmental temperature change. In FIG. 7, characteristic curve A1 denotes characteristics of the angular rate sensor 1 in which the substrate 2 is made of a material (amorphous carbon) having Young's modulus and thermal expansion coefficient equivalent to or less than PZT, which is a main component of the piezoelectric ceramics included in the piezoelectric material 3, and characteristic curve B1 denotes characteristics in the case where the substrate 2 is made of PZT.

As can be seen from FIG. 7, when the substrate 2 is made of a material (amorphous carbon) having Young's modulus and thermal expansion coefficient equivalent to or less than PZT, which is a main component of the piezoelectric ceramics included in the piezoelectric material 3, the oscillator $1a$ is less subject to influence of environmental temperature change.

Figure 8:
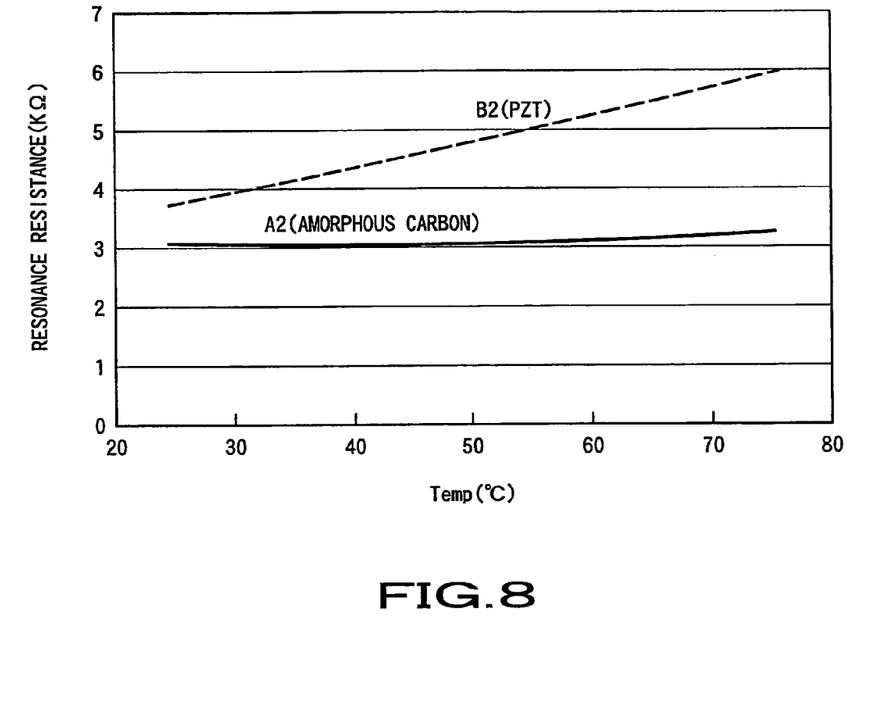
FIG. 8 shows temperature dependency of resonance resistance of a single body of the oscillator in the angular rate sensor.

Further, when the substrate 2 is made of a material (amorphous carbon), the oscillator $1a$ exhibits characteristics curve A2, as shown in FIG. 8. As compared to characteristics curve B2 obtained in the case where the substrate 2 is made of PZT, temperature change in resonance resistance of a single body of oscillator can be made small. Further, since the temperature change is linear, it is possible to perform compensation with respect to the characteristics easily.

Figure 9:
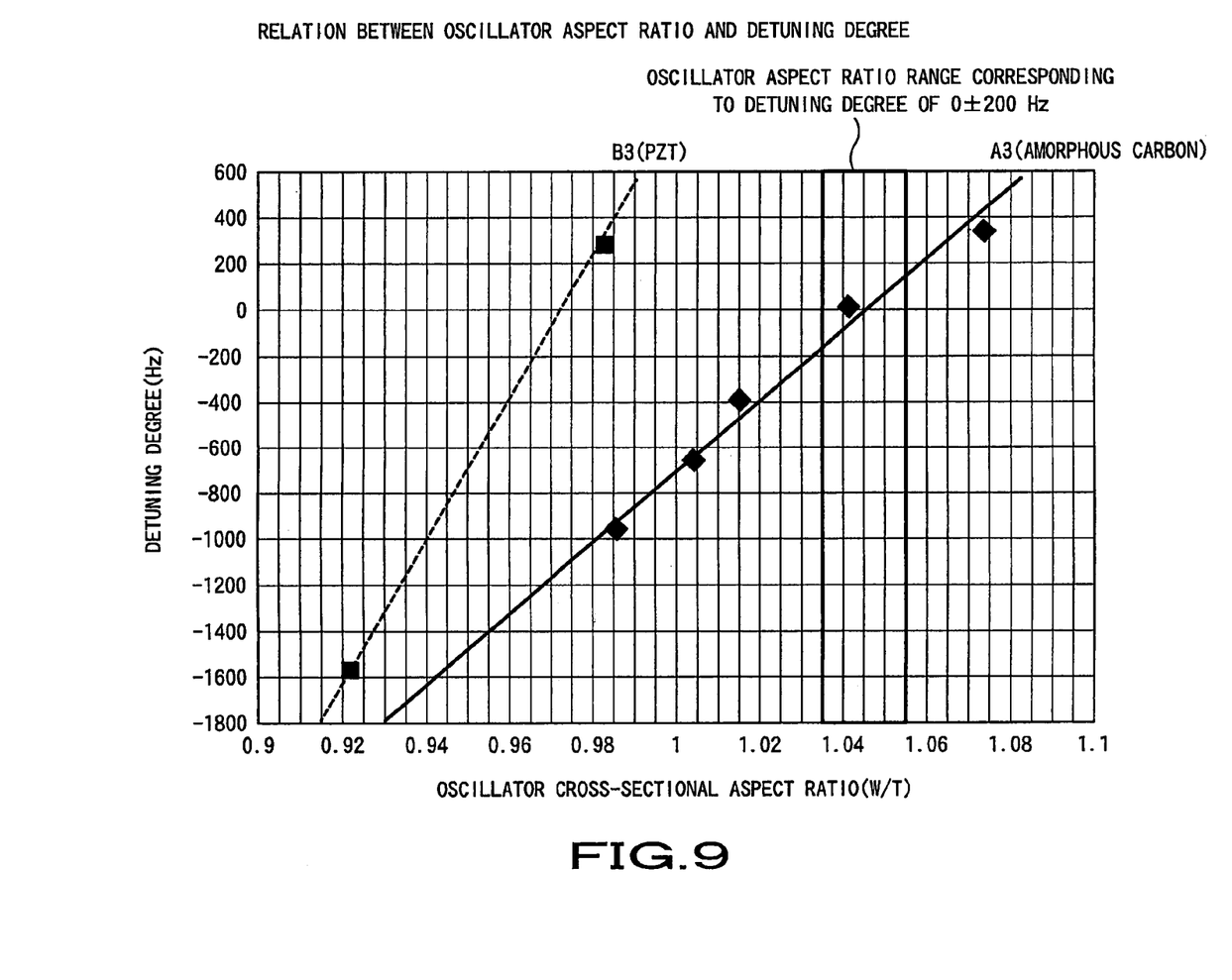
FIG. 9 shows the relationship between cross-sectional aspect ratio of the oscillator and detuning degree in the angular rate sensor.

FIG. 9 shows the relationship between cross-sectional aspect ratio of the oscillator 1a and detuning degree in the angular rate sensor 1. Note that, as described above, the detuning degree is a difference between resonance frequencies in the vertical and lateral directions. The smaller the detuning degree, the higher the sensitivity becomes.

In FIG. 9, characteristics line A3 denotes characteristics of the angular rate sensor 1 in which the substrate 2 is made of a material (amorphous carbon) having Young's modulus and thermal expansion coefficient equivalent to or less than PZT, which is a main component of the piezoelectric ceramics included in the piezoelectric material 3, and characteristic line B3 denotes characteristics in the case where the substrate 2 is made of PZT.

In FIG. 9, the aspect ratio range of the oscillator 1a corresponding to detuning degree of 0±200 Hz is surrounded by a black border. As can be seen from FIG. 9, by allowing a ratio between full width and thickness of the oscillator 1a, that is, the cross-sectional aspect ratio to fall within a range of 1.030 to 1.055, the detuning degree can be approximated near 0. Thus, by keeping the detuning degree to this level in initial state, it is possible to easily and certainly adjust the detuning degree.

Figure 10:
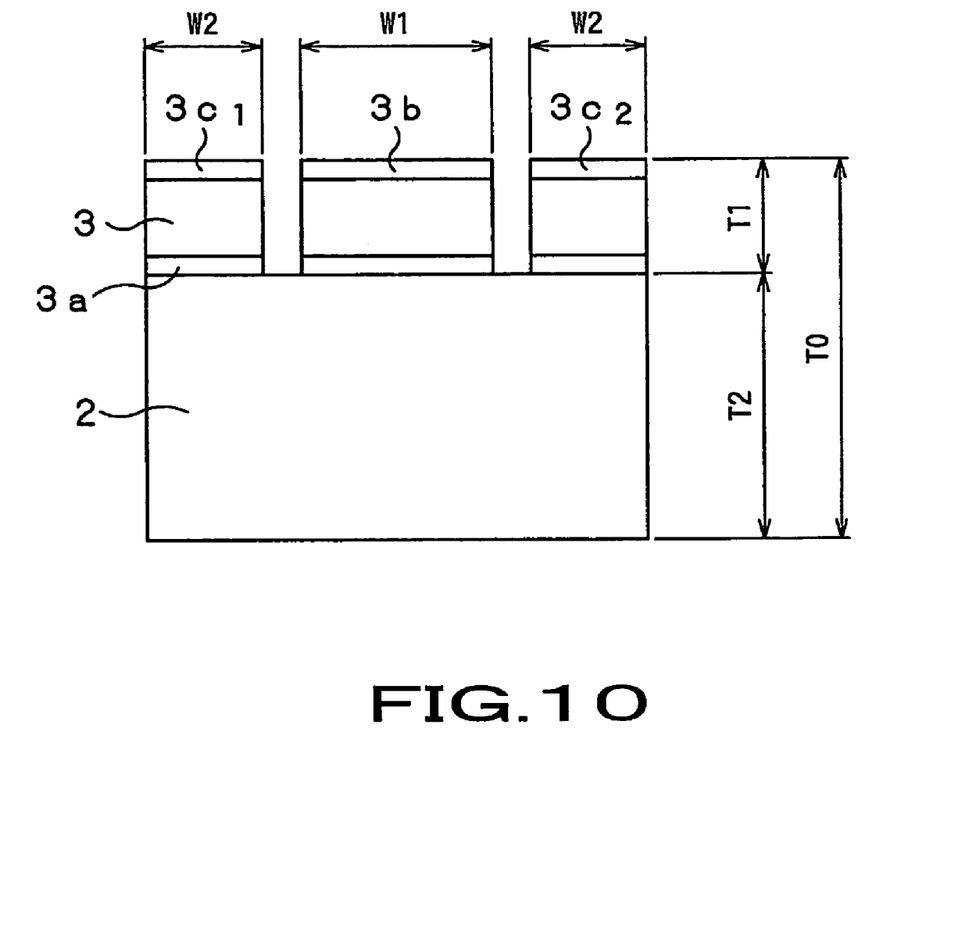
FIG. 10 is a cross-sectional view of the oscillator in the angular rate sensor.

When dimensions W1 and W2 of the drive electrode 3b and detection electrodes $3c_1$ and $3c_2$ in the width direction of the oscillator 1a are made different from each other, as shown in FIG. 10, detection characteristics of the angular rate sensor 1 can be optimized. That is, when the shape or size of the drive electrode 3b is adjusted, driving efficiency can be adjusted. Further, when the shapes or sizes of the detection electrodes $3c_1$ and $3c_2$ are adjusted, detection efficiency can be adjusted.

Figure 11:
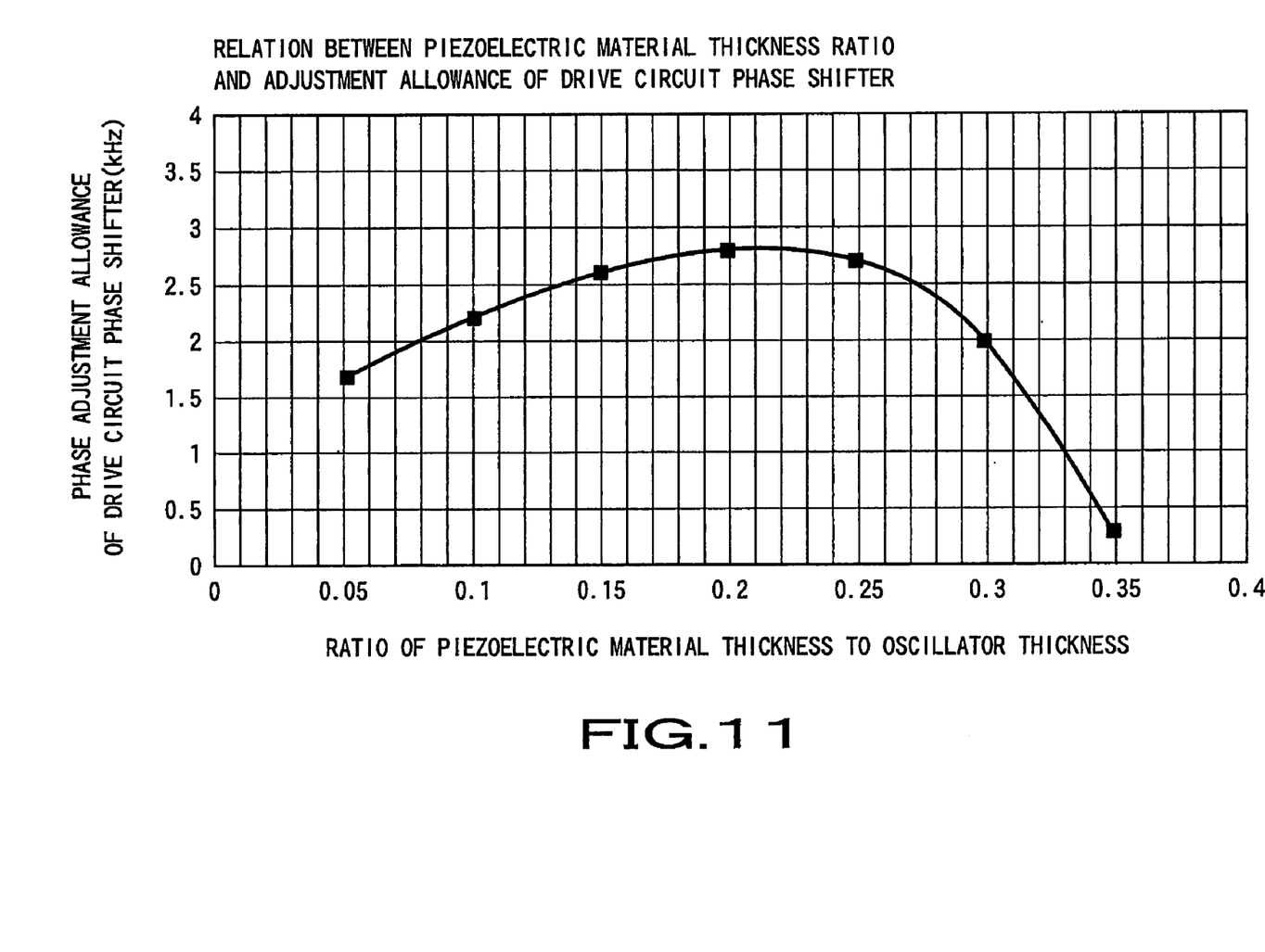
FIG. 11 shows a measurement result of adjustment allowance of a phase shifter in a drive circuit of the oscillator obtained by changing a ratio between the thicknesses of the piezoelectric material and the oscillator in the angular rate sensor.

In the angular rate sensor 1 according to the present embodiment, the thickness T1 of the piezoelectric material 3 is smaller than that of the substrate 2. Here, for example, the piezoelectric material 3 has a thickness T1 of 0.2 mm, and the substrate has a thickness T2 of 0.8 mm. When oscillation frequency of the oscillator 1a and adjustment allowance of the phase shifter in the drive circuit thereof are measured with a ratio between the thickness T1 of the piezoelectric material 3 and the thickness T0 of the oscillator 1a changed, a result as shown in FIG. 11 can be obtained. When the ratio between the thickness T1 of the piezoelectric material 3 and the thickness T0 of the oscillator 1a is allowed to fall within a range of 0.14 to 0.27, more concretely, the thickness T0 of the oscillator 1a is allowed to fall within a range of 0.9 mm to 1.1 mm, and the thickness T1 of the piezoelectric material 3 is allowed to fall within a range of 0.15 mm to 0.25 mm, it is possible to reduce resonance resistance and oscillation frequency within a certain range, and to assure enough phase margin in the drive circuit for self-excited oscillation of the oscillator 1a. Further, it is possible to reduce the degree of frequency change with respect to the dimensional change in the oscillator 1a, which makes it easy to perform adjustment to a predetermined detuning degree or oscillating frequency.

As describe above, the angular rate sensor 1 has a very simple structure, and thereby does not lose accuracy even when the size thereof is reduced. Therefore, it is possible to obtain high-cost performance and highly-accurate configuration. That is, it is possible to obtain the configuration having a potential for producing high volume efficiency. Further, since the cost and the size of the angular rate sensor 1 can be further reduced and the sensitivity thereof can also further be increased, it is possible to meet the demands of further size reduction and high cost performance when the angular rate sensor is applied to a video camera, virtual reality device or the like.

What is claimed is:

1. An angular rate sensor comprising:
a quadratic prism-like oscillator formed by laminating a substrate and a piezoelectric material,
wherein,
the piezoelectric material being made of piezoelectric ceramics including PZT (Lead Zirconate Titanate) as a main component,
the substrate being made of a material other than PZT, having physical property values equivalent to or less than PZT, which is the main component of the piezoelectric ceramics, with respect to Young's modulus and thermal expansion coefficient, and
a ratio between the thickness of the piezoelectric material and that of the oscillator is within a range of about 0.14 to about 0.27.

2. The angular rate sensor according to claim 1, wherein the substrate is made of a material including carbon as a main component.

3. The angular rate sensor according to claim 2, wherein the substrate is made of amorphous carbon.

4. The angular rate sensor according to claim 1, wherein a ratio between the full width and thickness of the oscillator is allowed to fall within a range of about 1.030 to about 1.055.

5. The angular rate sensor according to claim 1, comprising:
a reference electrode which is formed on one main surface of two opposed surfaces of the piezoelectric material, the one main surface being bonded to the substrate, and which is connected to a reference potential;
at least one drive electrode which is formed on the other main surface of the two opposed surfaces of the piezoelectric material in a longitudinal direction of the oscillator, and to which a signal for oscillating the oscillator is supplied; and
at least a pair of detection electrodes which are formed, in parallel with each other, on the other main surface of the two opposed surfaces of the piezoelectric material in a manner to sandwich the drive electrode, and which output a signal corresponding to Coriolis force generated in the oscillator,
wherein
a voltage is applied between the drive electrode and the reference electrode to allow the piezoelectric material to oscillate the oscillator, Coriolis force generated in the oscillator is detected with the piezoelectric material, and
an angular rate detection signal is output, as a signal corresponding to Coriolis force, from the detection electrodes.

* * * * *